United States Patent [19]

Guest

[11] Patent Number: 5,038,455
[45] Date of Patent: Aug. 13, 1991

[54] METHOD OF MANUFACTURING TUBE COUPLING BODIES

[76] Inventor: John D. Guest, "Iona" Cannon Hill Way, Bray, Maidenhead, Berkshire, United Kingdom

[21] Appl. No.: 327,308

[22] Filed: Mar. 22, 1989

[30] Foreign Application Priority Data

Mar. 25, 1988 [EP] European Pat. Off. .......... 88302708

[51] Int. Cl.⁵ .................. B29C 43/04; B29C 57/00
[52] U.S. Cl. ........................................ 29/453; 29/237;
264/249; 264/296; 264/322; 264/328.1;
264/DIG. 66; 285/423; 425/392; 425/577
[58] Field of Search ............... 264/294, 295, 296, 318,
264/319, 320, 322, 325, 248, 249, DIG. 66,
DIG. 64, 328.1; 425/500, 501, 506, 392, 394,
395, 403, 340, 383, 577, 393; 29/508, 516, 237,
445, 453; 285/423, 425

[56] References Cited

U.S. PATENT DOCUMENTS

| | | | |
|---|---|---|---|
| 2,958,906 | 11/1960 | Youthed | 264/248 |
| 3,674,292 | 7/1972 | Demler, Jr. | 264/249 |
| 3,929,943 | 12/1975 | Klimaszewski, Jr. | 264/320 |
| 4,018,462 | 4/1977 | Saka | 29/508 |
| 4,028,037 | 6/1977 | Dawson | 425/392 |
| 4,113,829 | 9/1978 | Bowker et al. | 264/295 |
| 4,345,956 | 8/1982 | Cox et al. | 264/249 |
| 4,390,383 | 6/1983 | Van Dongeren | 264/322 |
| 4,525,136 | 6/1985 | Rowley | 425/393 |
| 4,551,292 | 11/1985 | Fletcher et al. | 264/320 |
| 4,664,423 | 5/1987 | Rowley | 29/508 |
| 4,722,560 | 2/1988 | Guest | 285/423 |

FOREIGN PATENT DOCUMENTS

| | | | |
|---|---|---|---|
| 7408628 | 6/1974 | Belgium | 264/296 |
| 2721807 | 12/1977 | Fed. Rep. of Germany . | |
| 3606408 | 9/1986 | Fed. Rep. of Germany . | |
| 58-96512 | 6/1983 | Japan | 264/296 |
| 58-138614 | 8/1983 | Japan | 264/294 |
| 1520742 | 8/1978 | United Kingdom . | |
| 1576131 | 10/1980 | United Kingdom . | |
| 1599285 | 9/1981 | United Kingdom . | |

*Primary Examiner*—Jeffery Thurlow
*Assistant Examiner*—Mathieu Vargot
*Attorney, Agent, or Firm*—Jeffers, Hoffman & Niewyk

[57] ABSTRACT

Method of manufacturing a tube coupling body in a plastics material using injection moulding tooling. The body is formed with a cylindrical bore having enlarged end portions in a mould body and using removable cores. The cores form both the internal bore of the mould body and also end parts of the mould body so that once the cores are removed, end parts of the coupling body are revealed in the mould. While the end parts are still hot from the initial moulding operation, forming dies having tapering end cavities are pressed over the end parts of the moulding to form the end parts of the moulding with both external and corresponding internal tapered surfaces. The tapered internal surfaces of the end parts thus formed provide tapered cam surfaces for engaging the resilient arms of collets to be inserted in the coupling body to receive and lock tubes in the coupling body.

12 Claims, 8 Drawing Sheets

METHOD OF MANUFACTURING TUBE COUPLING BODIES

BACKGROUND OF THE INVENTION

1. Field of the invention

This invention relates to methods of manufacturing tube coupling bodies and is particularly, although not exclusively, applicable to methods of manufacturing tube coupling bodies for couplings of the type described and illustrated in our UK Patent Specification No. 1520742. The latter specification describes and illustrates a tube coupling comprising a body having a throughway open at one end of the body with a frusto conical cam surface in the throughway tapering towards said open end of the throughway, a collet located in the open end of the throughway having resilient fingers extending into the throughway to grip and engage a tube inserted through the collet into the body, the arrangement being such that movement of the tube in a direction outwardly of the throughway causes the arms of the collet to be forced into engagement with the tube by the tapered cam surface to grip and hold the tube in the coupling body.

2. Background prior art

EP-A-0132319 discloses a method of manufacturing a coupling body for such a tube coupling in moulded plastics in which the coupling body is moulded in one operation without the tapered cam surface and the cam surface is moulded in plastics in a separate annular insert to be located in the open end of the coupling body. The insert is subsequently joined to the coupling body by ultrasonic welding to form a cohesive unit with the body.

The object of the present invention is to simplify the manufacture of the coupling body.

SUMMARY OF THE INVENTION

This invention provides a method of manufacturing a tube coupling body having a throughway to receive a tube from an open end of the throughway to be secured in the coupling body, the method comprising the steps of initially moulding the body with a non-convergent throughway extending to said open end and, whilst the moulding is hot from the moulding operation, releasing at least a part of the moulded body adjacent said open end from the mould and applying a shaped die to the external surface of that end part to re-form said end part with an internal cross-section which reduces towards said open end.

In one method according to the invention the step of initially moulding the body may form the body with a parallel sided throughway extending to said open end.

In a further method according to the invention the step of initially moulding the body may form the body with a divergent throughway extending to said open end.

In any of the above methods the step of re-forming said end parts may form the internal cross-section with a tapered surface which converges towards said open end.

Also in any of the above methods the step of initially moulding the body may form the external surface of the body with a reducing taper towards said open end of the body.

The die may have a cavity which is tapered as it extends into the die to form an external taper on said end part of the coupling body and a corresponding internal tapered surface in the end part of the moulded body to form a cam surface for acting on the resilient arms of a collet to be inserted in the end part of the moulded body for clamping a tube in the body.

More specifically the body may be moulded in a mould having a cavity shaped to form an external surface of the body and a removable core shaped to form the internal surface of the body, the core having an annular recess to co-operate with the mould cavity in forming an annular end part of the body whereby, after moulding the body, removal of the core exposes the annular part of the moulded body on which said die forming operation is then performed.

According to a further feature a reinforcement ring may be applied to the external surface of the annular end part of the body around at least the part of the body containing the internal tapered surface to strengthen the end part of the body. For example the reinforcement ring may be welded to the body. Alternatively the reinforcement ring may be formed with an inwardly projecting annular rib and the external surface of the body is formed with an annualar groove in which the rib is engageable to retain the ring on the body.

In a further arrangement the external surface of the body may be formed with an annular shoulder facing away from the open end of the body and the reinforcing ring encircles the part of the body between the shoulder and the open end of the body with a rib on the ring engaging the shoulder to retain the ring on the body.

The ring may be formed to project beyond the open end of the body and is formed with an inturned flange spaced from the open end to retain a collet located in the open end of the body for coupling a tube to the body.

In any of the above methods the body may be formed with a plurality of annular open ends in said moulding operation and each of said end parts of the moulding is released whilst still hot and subjected to said die forming operation to re-form each end part with an internal tapered surface which reduces a cross-section towards the open end thereof.

The invention also provides a tube coupling body having a throughway to receive a tube from an open end of the throughway to be secured in the coupling body, the body comprising a pre-formed plastics moulding with a post-formed annular open end part having an internal surface which reduces towards the open end thereof to receive a collet projecting into the open end and having a plurality of resilient fingers engagable with the tapered surface to compress the fingers against a tube extending through the collet to lock the tube in the body.

A reinforcement ring may be applied to the external surface of the annular end part of the body around at least that part of the body containing the internal reducing surface to strengthen said end part of the body.

For example the reinforcement ring may be welded to the body.

Alternatively the reinforcement ring may be formed with an inwardly projecting annular rib and the external surface of the body is formed with an annular groove in which the rib is held with a "snap-in" engagement to retain the ring on the body.

In a further arrangement the external surface of the body may be formed with an annular shoulder facing away from the the open end of the body and the reinforcing ring encircles the part of the body between the shoulder and the open end of the body with a rib on the ring engaging the shoulder to retain the ring on the body.

The ring may project beyond the open end of the body and is formed with an inturned flange spaced from the open end to retain a collet location in the open end of the body for coupling a tube to the body.

DESCRIPTION OF THE PREFERRED EMBODIMENTS

Figure 1:
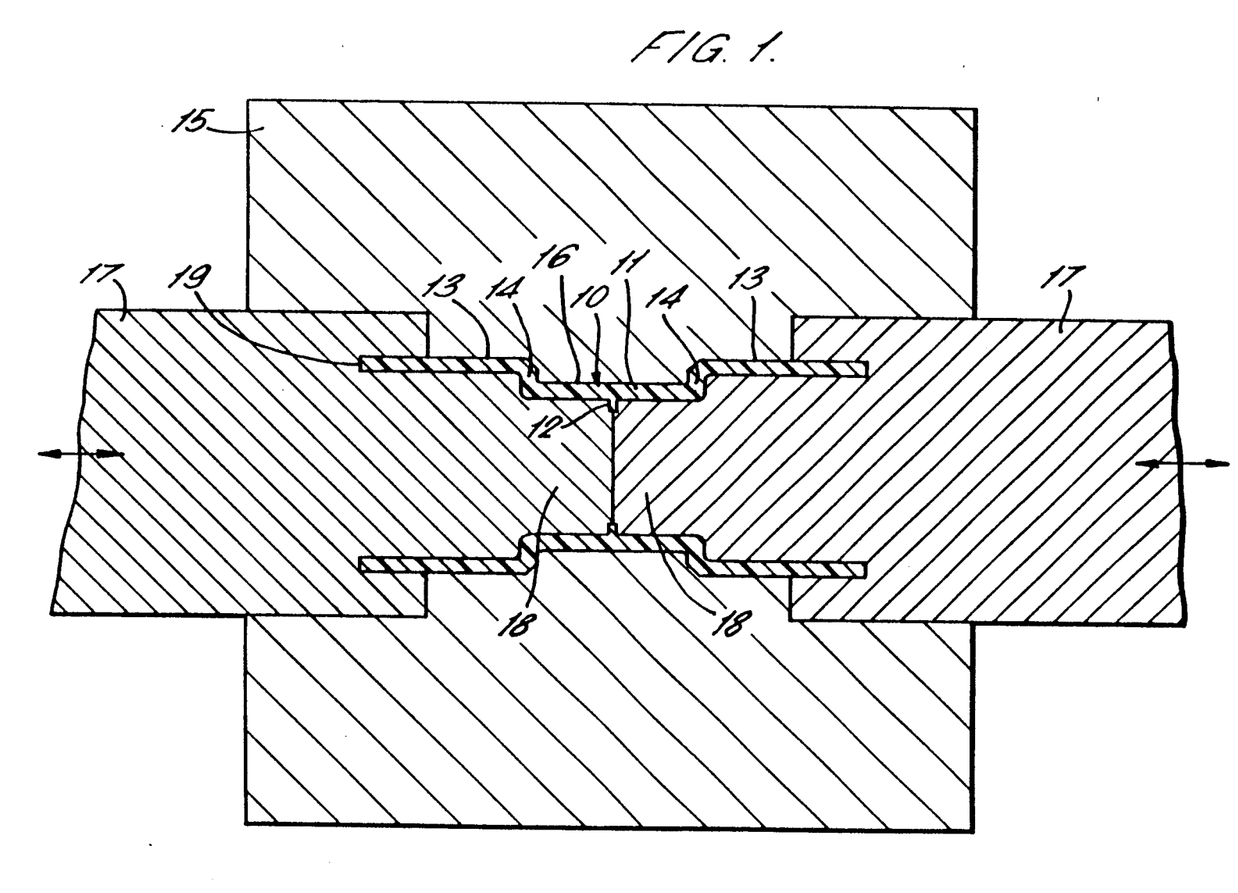
FIG. 1 is a sectional view through an injection mould tool for part forming a coupling body for a tube coupling.

Referring firstly to FIG. 1 of the drawings, there is shown tooling for injection moulding of a partly formed coupling body 10 in a plastics material such as polysulphone. The body comprises a central cylindrical portion 11 having an inner annular rib 12 at its centre and enlarged diameter cylindrical end portions 13 joined to the central portion by steps 14. The mould tooling comprises a mould body 15 having a mould cavity 16 shaped to form the outer surface of the mould body with a reduced diameter central portion 11 of the mould body and enlarged diameter end portions 13. Cylindrical removable cores 17 project into the mould cavity from opposite sides thereof, each core comprising a cylindrical base 17a with a reduced diameter spigot 18 projecting therefrom which is stepped at 18a to form a further reduced diameter end portion. The cores are shaped to form together the inner surface of the mould body. At the junction between cylindrical base 17a and the spigot 18 of each core there is an annular recess 19 extending into the main part of the core the inner surface 19a of which forms a continuation of the surface of the spigot 18 and the outer surface 19b of which forms a continuation of the adjacent mould surface 13. The recesses form the end parts of the coupling body.

Figure 2:
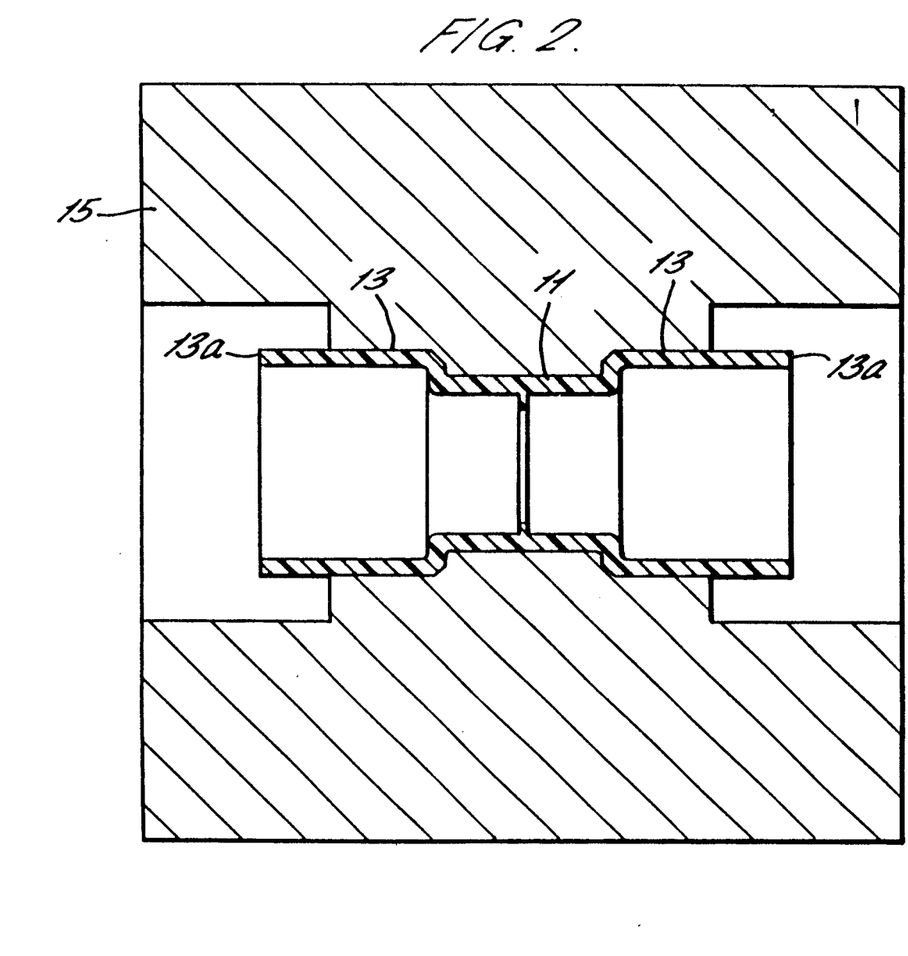
FIG. 2 is a similar view to FIG. 1 showing the moulded body with the cores of the tooling removed.
Figure 3:
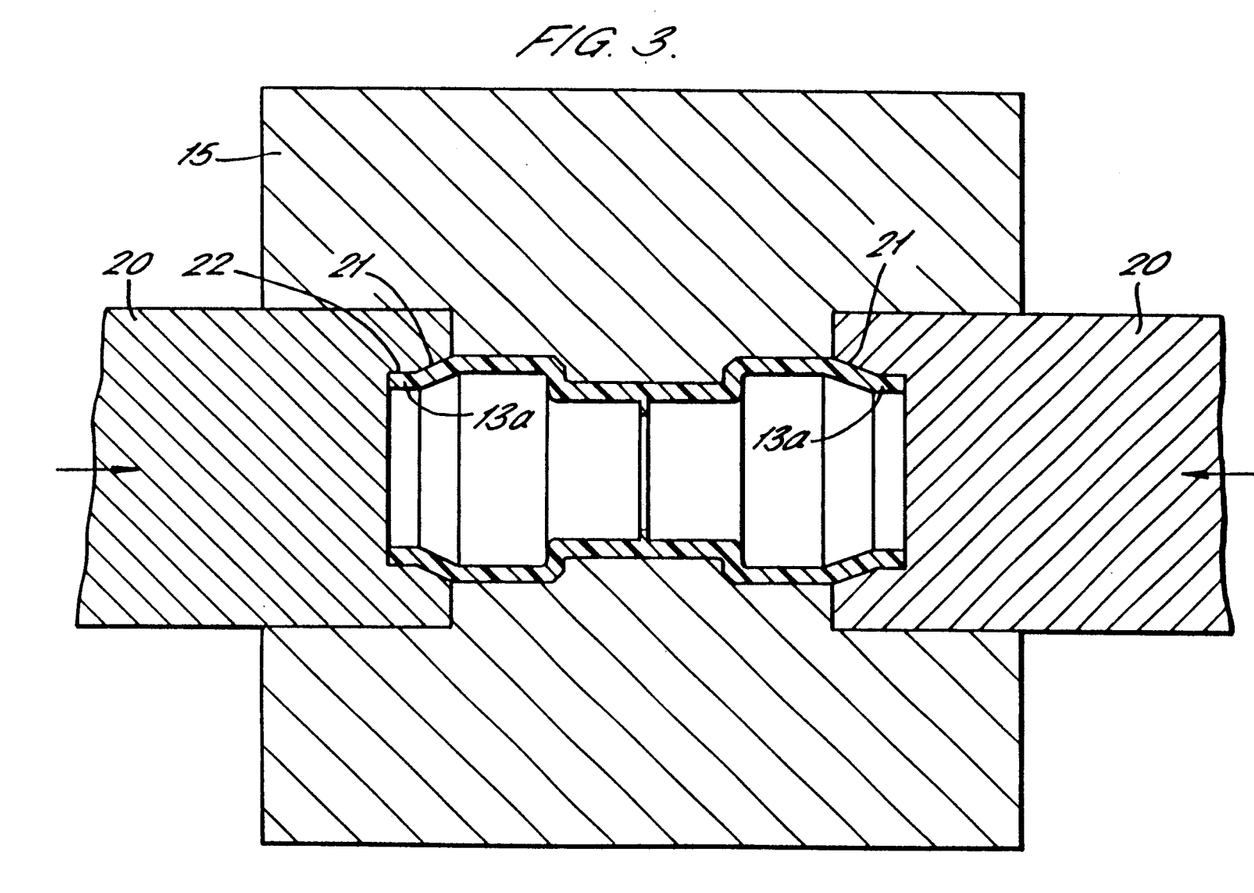
FIG. 3 shows a further forming operation being carried out on the ends of the coupling body whilst still located in the mould of the tooling.

After injecting plastics into the mould to create the coupling body, the cores 17 are extracted once the plastics has set sufficiently to be self supporting whilst still being relatively hot to leave the part moulded coupling body in the mould cavity as shown in FIG. 2. It will be seen that end parts indicated at 13a of the coupling body created in the recesses 19 of the cores are left unsupported. Cylindrical forming dies 20 are now inserted in the mould 15 as shown in FIG. 3. Each die has a tapering end cavity 21 to receive and reform the end parts 13a of the coupling body with tapering outer surfaces and with corresponding tapering surfaces. At the bottom of each tapered cavity 21 in the dies, there is a short cylindrical portion 22 which forms a short cylindrical end at the tapered end of the body.

Figure 4:
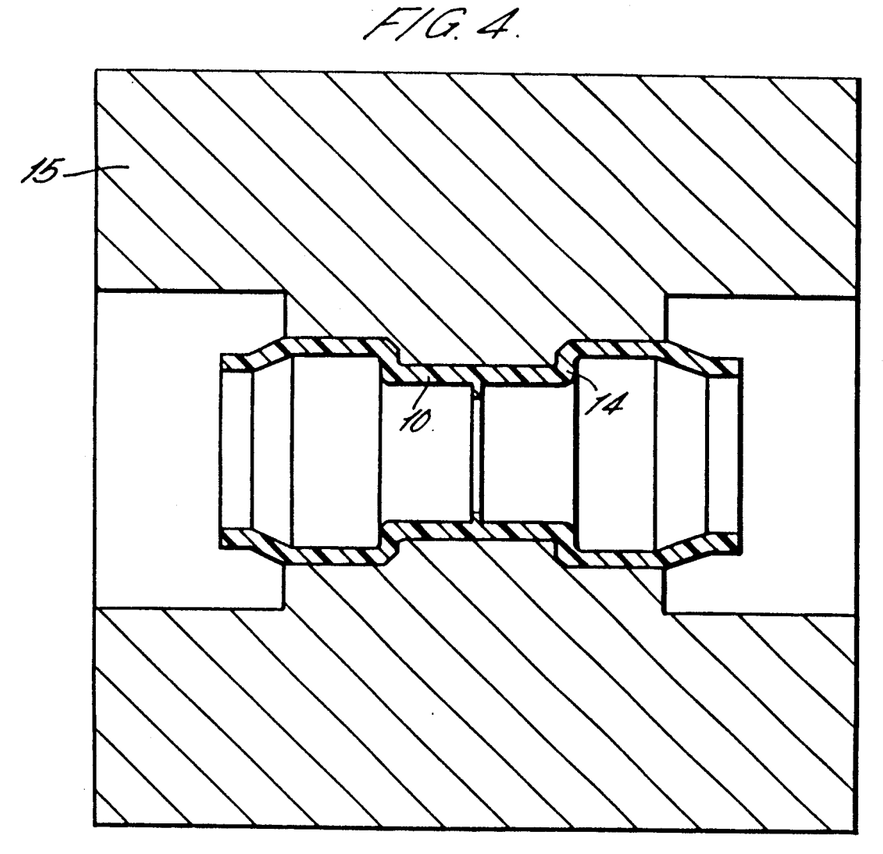
FIG. 4 shows the finished coupling body ready for ejection from the mould.

After reforming the end parts of the moulding, the dies are separated from the mould leaving the moulded coupling body in the mould as shown in FIG. 4 ready for ejection.

Figure 5A:
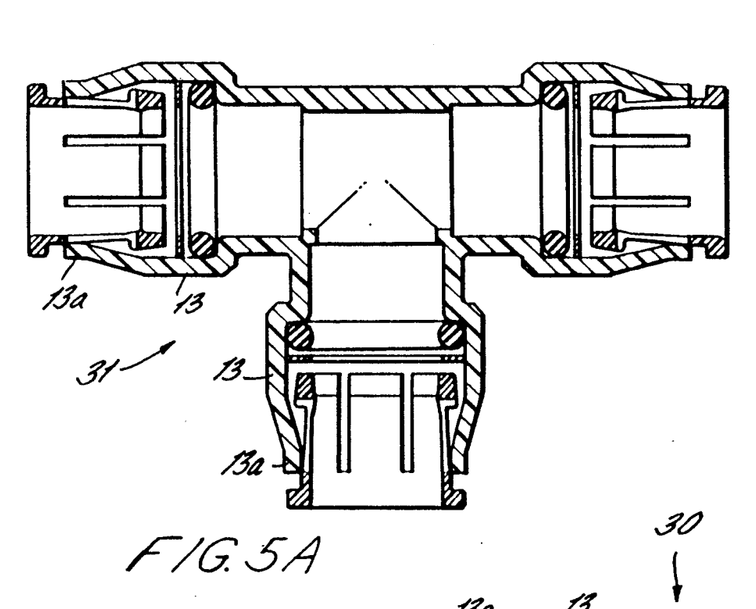
FIGS. 5A, 5B and 5C show various completed tube couplings having coupling bodies formed by apparatus of the form illustrated in FIGS. 1 to 4.
Figure 5B:
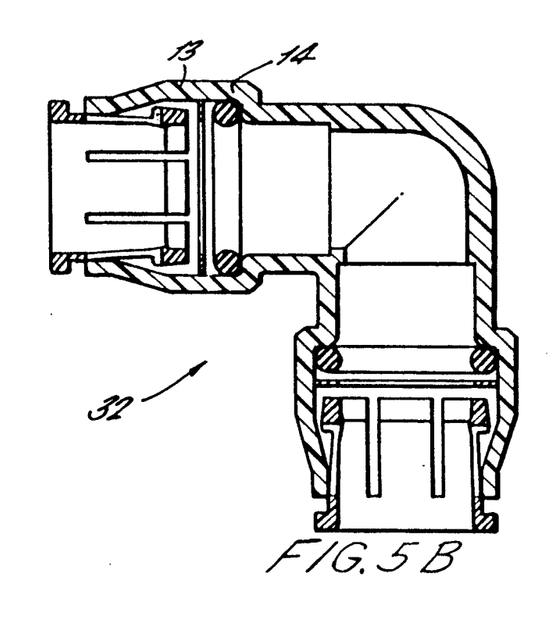
Figure 5C:
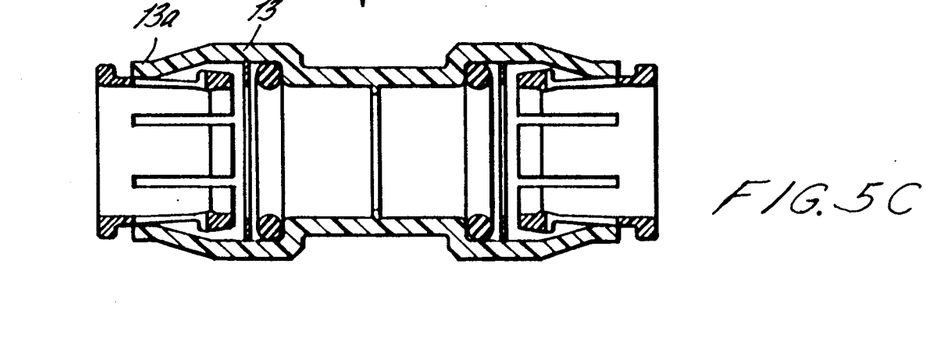

FIG. 5 shows a number of different forms of coupling body which can be manufactured using this technique. 30 indicates a coupling body of straight cylindrical form open at both ends as manufactured by the tooling described above. A modified form of the tooling enables a T shaped coupling body to be created as shown at 31 and a further modified form of tooling enables an elbow form to be created as shown at 32.

The main advantage with this invention is that it reduces considerably the cost of manufacture as it is much quicker and easier to provide the recessed end forms shown in this manner within the mould, whilst the component is still in the hot condition. For large pipe fittings it is possible to produce the recessed final form by the use of collapsible cores, but these are of necessity more complex and far more costly arrangements. For very small pipe sizes collapsible cores of this type are not practical and other more expensive methods have to be employed.

Figure 6:
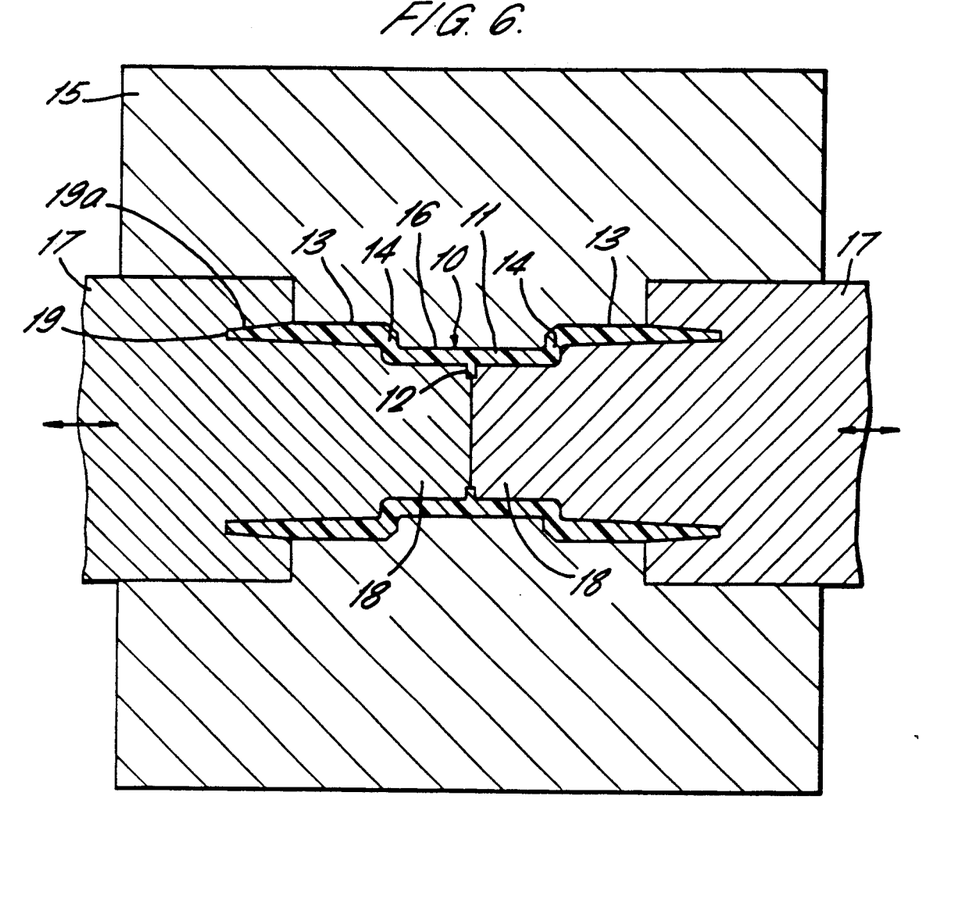
FIGS. 6 and 7 show a modified form of the mould tool of FIG. 1.
Figure 7:
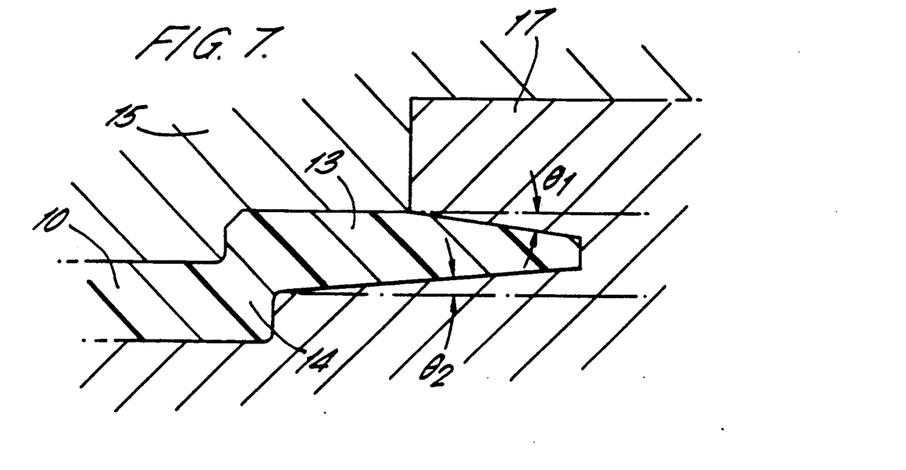

FIGS. 6 and 7 show a modified form of the mould tooling described above with reference to FIG. 1. The modifications relate to the removable cores 17. The outer surface 19a of the recess tapers towards the bottom of the recess instead of being of cylindrical form by an angle $O_1$ as indicated on FIG. 7 to form the end part of the coupling body moulding with a tapered external surface. The part of the spigot 18 up to the step 18a is tapered by an angle indicated at $O_2$ and the inner surface 19a of the recess has a corresponding taper to form a continuation of the outer surface of the spigot. The inner and outer surfaces of the recess thus converse towards the bottom of the recess. After extraction of the cores 17 the tapered end parts of the moulding are post-moulded as described above with reference to FIG. 3.

Figure 8:
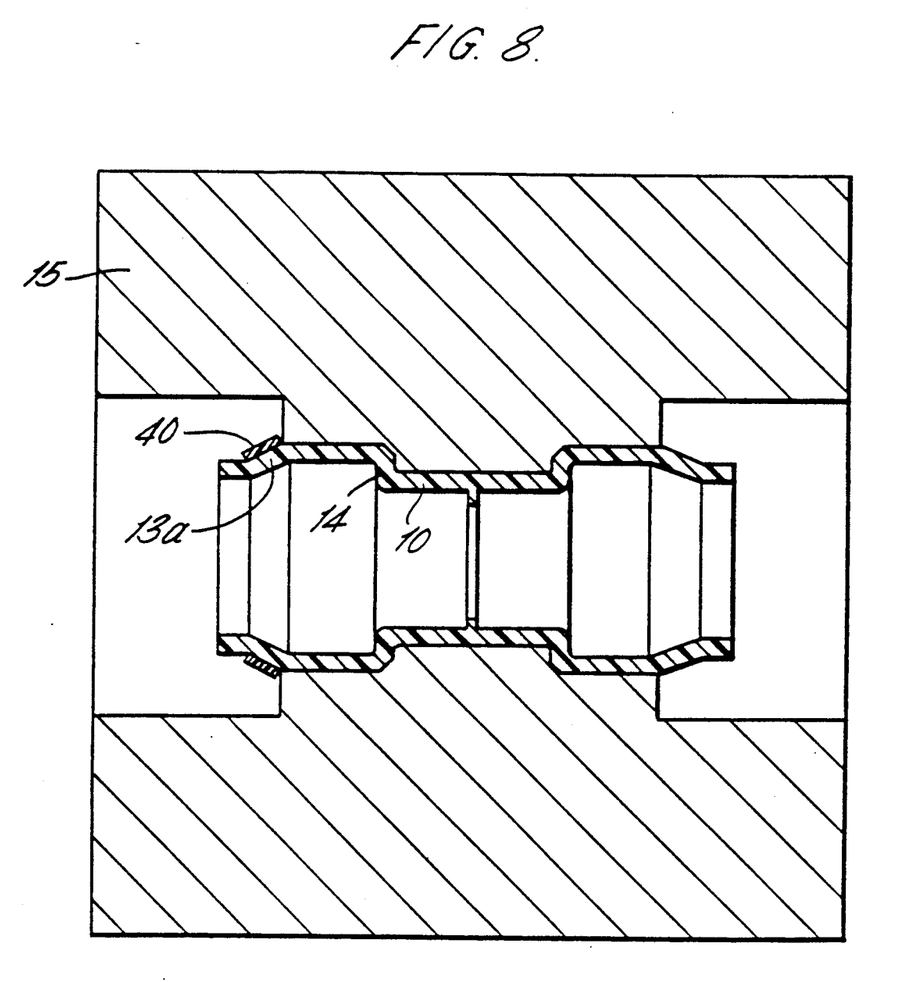
FIG. 8 shows the application of reinforcing ring to the formed end of the coupling body.

Referring now to FIG. 8 of the drawings, the post-formed moulding is shown before removal from the mould body 15 immediately after retraction of the forming dyes 20. Tapered rings 40 are then applied to the external surface of the tapered end parts 13a created in the post-forming operation, the rings being raised to snap into grooves formed in the tapered end parts or being welded or swaged onto the tapered end parts. The reinforcing rings are applied before the post-formed end parts have achieved a permanent set or that is before a permanent change in the elastic material of the moulding has taken place e.g. cross linking of a polyethylene plastics material. Reinforcing rings ensure that the tapered end parts are held permanently in the post-formed shape and also assist in resisting the loads imposed on the tapered end parts by the tube gripping column that is located in the ends of the coupling in use.

Figure 9:
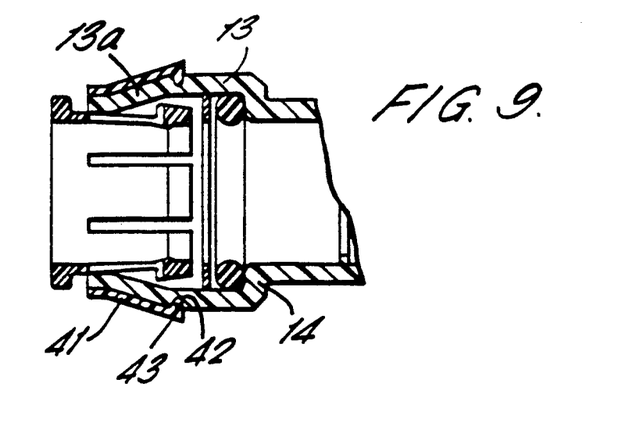
FIGS. 9 to 11 shown various further reinforcement arrangements.
Figure 10:
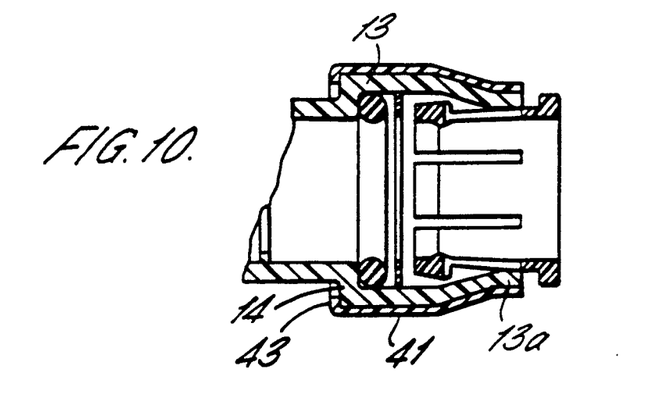
Figure 11:
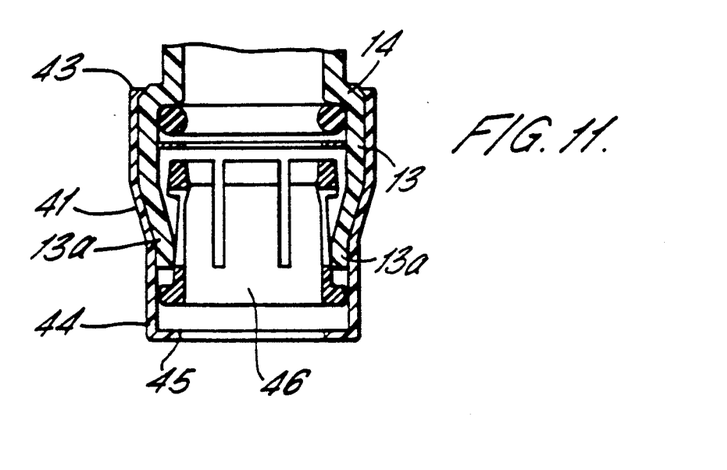

Further more elaborate forms of reinforcing members for the moulded coupling bodies are illustrated in FIGS. 9 to 11 which will now be referred to. In FIG. 9, the whole of the end part 13a of the mould is encircled by the correspondingly shaped reinforcing sleeve 41. The outer surface of the moulding 13 is formed with a groove 42 in which an integral rib 43 on the sleeve 41 is a "snap-in" engagement to hold the sleeve on the end part 13a. FIG. 10 shows a further arrangement in which the sleeve 41 is extended to the stepped shoulder 14 in the coupling body and the rib 43 on the sleeve snaps over the shoulder 41 to retain the sleeve on the end part of the coupling body. In the arrangements shown in FIG. 11 the sleeve 41 has a cylindrical extension 44 which projects beyond the open end of the coupling body and is formed with an inturned end flange 45 which acts to retain collet 46 in the coupling body which locks a tube in the coupling body.

I claim:

1. A method of manufacturing a tube coupling body having a throughway to receive a tube from an open end of the throughway to be secured in the body, the method utilizing a mould having a mould cavity defining a coupling body having a non-convergent throughway extending along the body to said open end, the mould including a mould body part and a separable core part, the core part defining the coupling body in the region of said open end and the mould body part defining the remainder of the coupling body, the method comprising the steps of: i) initially moulding a coupling body in said mould with the mould body and core parts of the mould located together; ii) whilst the moulding is hot from the moulding operation, releasing said core part of the mould from the mould body part of the mould thereby leaving the moulding supported in the mould body part of the mould and leaving the region of the moulding including said open end unsupported in the mould; iii) applying a shaped die to an external surface of the moulding in the region of said open end whilst the moulding is still hot from the moulding operation and reforming the region of the moulding including the open end so that the internal cross-section of the throughway in the region including said open end reduces towards said open end of the moulding.

2. A method as claimed in claim 1, wherein the step of initially moulding the body forms the body with a parallel sided throughway extending to said open end.

3. A method as claimed in claim 1, wherein the step of initially moulding the body forms the body with a divergent throughway extending to said open end.

4. A method as claimed in claim 1, wherein the step of re-forming said region forms the internal cross-section with a tapered surface which converges towards said open end.

5. A method as claimed in claim 1, wherein the step of initially moulding the body forms the external surface of the body with a reducing taper towards said open end of the body.

6. A method as claimed in claim 1, wherein the die has a cavity which is tapered as it extends into the die to form an external taper on the region of the coupling body including said open end and a corresponding internal tapered surface in the region of the moulded body including said open end to form a cam surface for acting on the resilient arms of a collet to be inserted in the moulded body for clamping a tube in the body.

7. A method as claimed in claim 6, wherein the mould cavity is shaped to form an external surface of the body and the core part is shaped to form the internal surface of the body, the core part having an annular recess to co-operate with the mould cavity in forming an annular end part of the body including said open end whereby, after moulding the body, removal of the core part exposes the annular part of the moulded body on which said die reforming operation is then performed.

8. A method as claimed in claim 1, wherein a reinforcement ring is applied to the region of the body including the open end to thereby strengthen said region.

9. A method as claimed in claim 8, wherein the reinforcement ring is welded to the body.

10. A method as claimed in claim 8, wherein the reinforcement ring is formed with an inwardly projecting annular rib and the external surface of the body is formed with an annular groove in which the rib is engageable to retain the ring on the body.

11. A method as claimed in claim 8, wherein the external surface of the body is formed with an annular shoulder facing away from the open end of the body and the reinforcing ring encircles the part of the body between the shoulder and the open end of the body with a rib on the ring engaging the shoulder to retain the ring on the body.

12. A method as claimed in claim 8, wherein the ring projects beyond the open end of the body and is formed with an inturned flange spaced from the open end to retain a collet located in the open end of the body for coupling a tube to the body.

* * * * *